US007998301B2

(12) United States Patent
Denholm et al.

(10) Patent No.: US 7,998,301 B2
(45) Date of Patent: Aug. 16, 2011

(54) LABEL APPLICATION SYSTEM

(75) Inventors: Scott Denholm, Boca Raton, FL (US); John C. Ford, Boca Raton, FL (US)

(73) Assignee: Sensormatic Electronics, LLC, Boca Raton, FL (US)

(*) Notice: Subject to any disclaimer, the term of this patent is extended or adjusted under 35 U.S.C. 154(b) by 325 days.

(21) Appl. No.: 11/636,182

(22) Filed: Dec. 9, 2006

(65) Prior Publication Data

US 2007/0095464 A1 May 3, 2007

Related U.S. Application Data

(62) Division of application No. 10/437,313, filed on May 13, 2003, now Pat. No. 7,147,028.

(51) Int. Cl.

| | |
|---|---|
| ***B29C 37/00*** | (2006.01) |
| ***B32B 37/14*** | (2006.01) |
| ***B32B 37/22*** | (2006.01) |
| *B32B 39/00* | (2006.01) |
| *B32B 38/18* | (2006.01) |

(52) U.S. Cl. ........ 156/232; 156/245; 156/230; 156/231; 156/248; 156/267; 156/268

(58) Field of Classification Search .......... 156/230–249, 156/254, 267, 268

See application file for complete search history.

(56) References Cited

U.S. PATENT DOCUMENTS

| | | | | |
|---|---|---|---|---|
| 2,304,787 A | * | 12/1942 | Avery | 156/248 |
| 4,046,613 A | * | 9/1977 | Kucheck et al. | 156/249 |
| 4,397,709 A | * | 8/1983 | Schwenzer | 156/351 |
| 4,876,839 A | * | 10/1989 | Honda et al. | 53/136.3 |
| 4,940,966 A | * | 7/1990 | Pettigrew et al. | 340/551 |
| 5,006,856 A | * | 4/1991 | Benge et al. | 340/572.3 |
| 5,309,695 A | * | 5/1994 | Frabetti et al. | 53/136.1 |
| 5,357,240 A | * | 10/1994 | Sanford et al. | 340/572.8 |
| 5,586,657 A | * | 12/1996 | Ward et al. | 206/705 |
| 5,745,039 A | * | 4/1998 | Hof et al. | 340/590 |
| 5,955,951 A | * | 9/1999 | Wischerop et al. | 340/572.8 |
| 6,123,796 A | * | 9/2000 | Kathmann et al. | 156/249 |

FOREIGN PATENT DOCUMENTS

WO WO 0030963 A1 * 6/2000

OTHER PUBLICATIONS

"Proximate"—http://dictionary.reference.com/browse/proximate.*
"Contigious"—http://dictionary.reference.com/browse/contigious.*
Schumann et al.—English translation of description and claims of WO0030963, Jun. 2000.*

* cited by examiner

*Primary Examiner* — Sonya Mazumdar
(74) *Attorney, Agent, or Firm* — Kacvinsky Dalsak PLLC

(57) ABSTRACT

Techniques to apply a label to an object are described. In one embodiment, the label application system can include a magazine, an indexer, a separator, an applicator and an impressor. The magazine may hold one or more sets of contiguous labels. The indexer advances a label from the contiguous set of labels. The separator separates the label from the contiguous set of labels. The applicator may apply adhesive to the separated label or, alternatively, a substrate of the object. The impressor presses the label onto the desired object to complete the attachment process. In one embodiment the indexer is mechanically implemented. Alternatively, the indexer can receive control signals from a processor which control the movement of the indexer through the desired indexing positions.

12 Claims, 3 Drawing Sheets

LABEL APPLICATION SYSTEM

CROSS-REFERENCE TO RELATED APPLICATIONS

This application is a divisional of U.S. patent application Ser. No. 10/437,313 filed May 13, 2003, now U.S. Pat. No. 7,147,028, entitled A LABEL APPLICATION SYSTEM, the entire disclosure of which is hereby expressly incorporated by reference.

BACKGROUND OF THE INVENTION

An Electronic Article Surveillance (EAS) system is designed to prevent unauthorized removal of an object from a controlled area. A typical EAS system may comprise a monitoring system and one or more security labels. The monitoring system may create a surveillance zone at an access point for the controlled area. A security label may be attached to the object. The object may be a product or packaging used to encapsulate the product, for example. If the monitored object enters the surveillance zone, an alarm may be triggered indicating potential unauthorized removal.

In some cases, it may be desirable to attach the security labels to the monitored object in an automated process, particularly for large volume manufacturing. Therefore, there may be a need for improved techniques in label application systems in general, and security label application systems in particular.

Products intended for mass consumption are typically made using automated assembly lines. An example of a product may be a Compact Disc (CD). In many cases, there may be a need to affix a label to the product or packaging material encapsulating the product. An example of a label may be an EAS security tag. Until recently, such tags were applied by the end retailer. Lately, there has developed a demand by large retailers that these labels be already affixed when the products arrive from the manufacturer or wholesale-distributor. Due to the large volumes of products, it may be impracticable for the retailer to carry out this process. Therefore, there may be a substantial need for label application systems operable in the rapid, automated fashion necessary to their incorporation in an assembly line.

Conventional label application systems, however, may be unsatisfactory for a number of reasons. For example, conventional systems may be designed to use adhesive-backed labels carried on a backing, also referred to sometimes as a release liner, web or carrier. The adhesive-backed labels may be difficult to remove from the backing, and require specialized equipment such as a peeler. Further, there may be need to eliminate the backing and any other excess material from the system. In addition, the adhesive may interfere with any cutting process used by the system. Finally, the adhesive cannot be changed to suit a particular product or packaging material. These problems may increase the complexity of the system, and therefore costs to build and maintain the system.

SUMMARY OF THE INVENTION

The present invention is directed to techniques for automatically applying a label to an object. The object may be a product, or packaging material encapsulating the product. In one embodiment, the label application system may include, for example, a magazine, an indexer, a separator, an applicator and an impressor. The magazine may hold one or more sets of contiguous labels. The indexer may advance a label from the contiguous set of labels. The separator may separate the label from the contiguous set of labels. The applicator may apply adhesive to the separated label or, alternatively, a substrate of the object. The impressor may press the label onto the desired object and complete the attachment process. In one embodiment, the indexer is mechanically implemented. Alternatively, the indexer can receive control signals from a processor which control the movement of the indexer through the desired indexing positions.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Numerous specific details may be set forth herein to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention. It can be appreciated that the specific structural and functional details disclosed herein may be representative and do not necessarily limit the scope of the invention.

Figure 1:
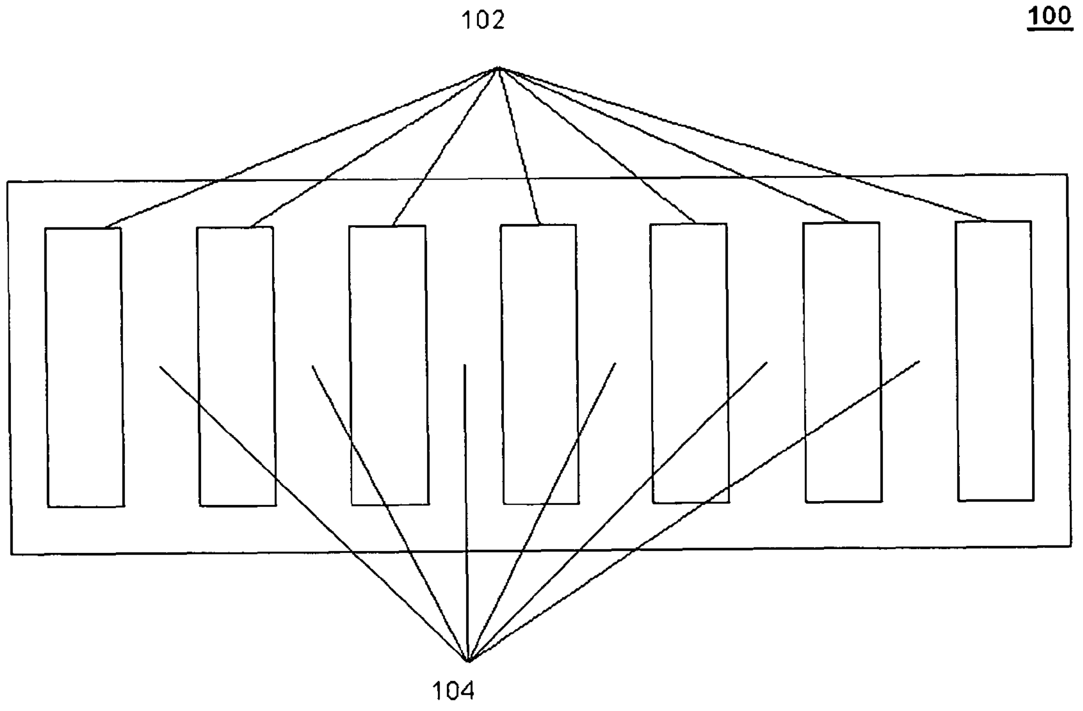
FIG. 1 illustrates a contiguous set of labels in accordance with one embodiment of the invention.

Referring now in detail to the drawings wherein like parts are designated by like reference numerals throughout, there is illustrated in FIG. 1 a contiguous set of labels in accordance with one embodiment of the invention. In one embodiment, FIG. 1 illustrates a contiguous set of labels, such as label strip 100. Label strip 100 may comprise a plurality of raised cavity structures 102 having interconnecting flange sections 104. Raised cavity structures 102 and flange sections 104 may be formed from any thin plastic material suitable for a particular application, such as EAS security tags. Label strip 100 may be separated into individual labels by cutting through the approximate center of interconnecting flange sections 104. The separated labels may be discussed in more detail with reference to FIGS. 2A and 2B.

In one embodiment, label strip 100 may comprise a strip of Ultra*Max EAS labels made by Sensormatic® Electronics Corporation, for example. In this embodiment, label strip 100 will not have an adhesive coating or backing as with conventional pressure sensitive labels.

Figures 2A, 2B:
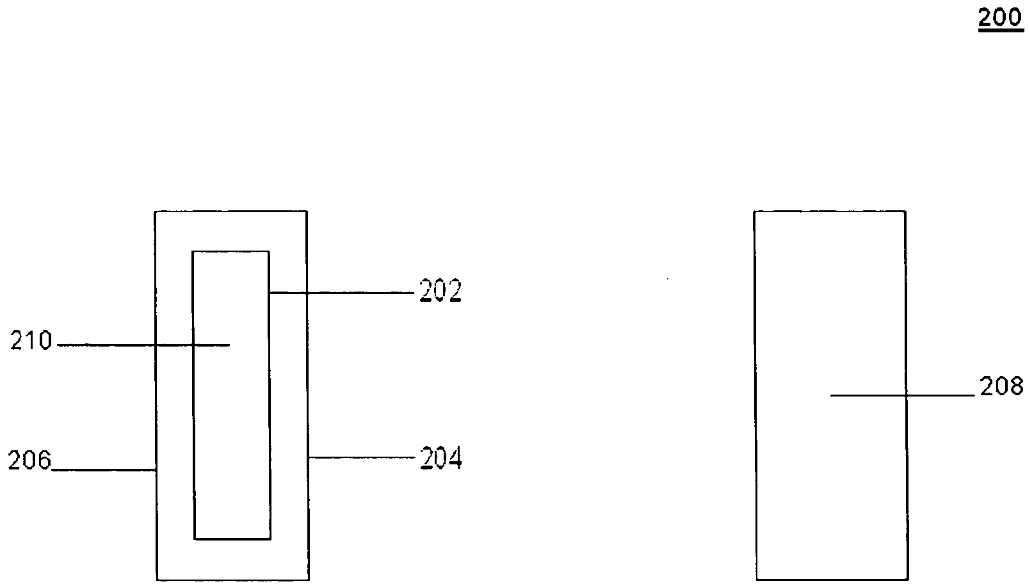
FIGS. 2A and 2B illustrate a front view and a back view, respectively, for a label in accordance with one embodiment of the invention.

FIGS. 2A and 2B illustrate a front view and a back view, respectively, for a label in accordance with one embodiment of the invention. In one embodiment, FIGS. 2A and 2B illustrate a label 200 after it has been separated from a contiguous set of labels, such as label strip 100. More particularly, FIG. 2A illustrates a front view of label 200 having a raised cavity structure 202, a flange 204, and a flange 206. Raised cavity structure 202 may have a top surface 210. FIG. 2B illustrates a back view of label 200, having an adhesive application surface 208.

As used herein, the term label may refer to any item that may be attached to an object. For example, the label may be a semi-rigid label, such as foil, paper and EAS security labels that incorporate circuitry. In another example, the label may be a rigid label, such as an EAS security label containing a magnetic strip. In any case, the label may be any label commonly used on or in a product, or the packaging materials used to encapsulate a product.

In one embodiment, raised cavity structure 202 may contain an EAS sensor. The EAS sensor may generate signals detectable by an EAS system, for example. In one embodiment, the EAS sensor may be an acoustically resonant magnetic sensor, as disclosed in U.S. Pat. Nos. 4,510,489 and 4,510,490, although the embodiments are not limited in this context.

Figure 3:
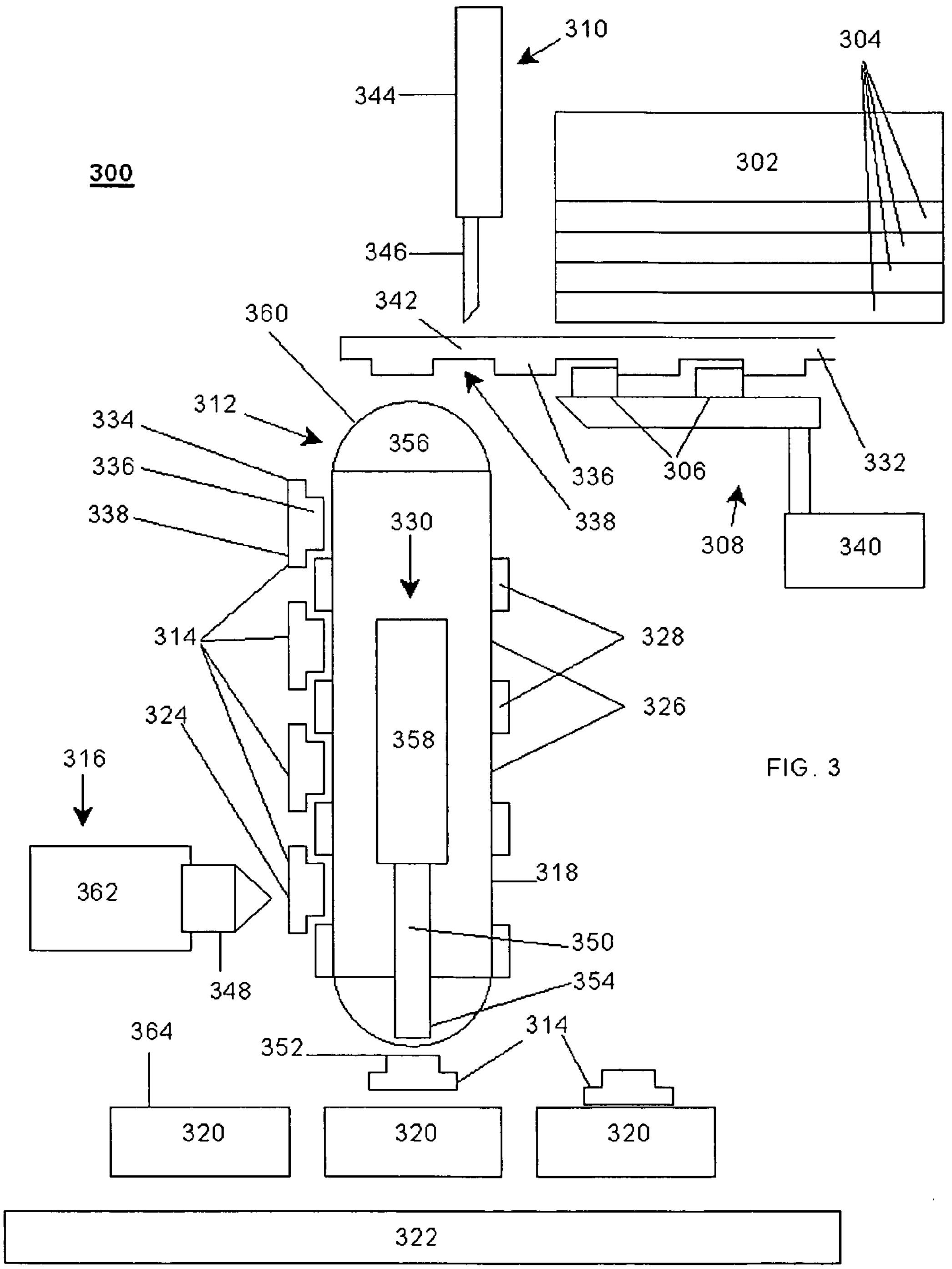
FIG. 3 illustrates a label application system in accordance with one embodiment of the invention.

FIG. 3 illustrates a label application system in accordance with one embodiment of the invention. In one embodiment, FIG. 3 illustrates a label application system 300. Label application system 300 may be designed to contain, index and cut strips of EAS non-adhesive labels, such as label strip 100. Label application system 300 may then automatically attach them to an object, such as the outer surface of a product or packaging for a product. It can be appreciated that support members and motors for various elements of label application system 300 have been omitted for purposes of clarity. It can be further appreciated that the functions for each of the structures shown in FIG. 3 may be separated into further structures, or combined into fewer structures, and still fall within the intended scope of the invention.

In one embodiment, label application system 300 may include a magazine 302. Magazine 302 may be a friction feed device containing one or more contiguous set of labels, such as a plurality of label strips 304. Label strips 304 may be representative of, for example, label strip 100 as discussed with reference to FIG. 1. Further, in one embodiment, label strips 304 will not have an adhesive coating or backing, and each label strip is of the same predetermined length. The predetermined length for a particular implementation may vary depending upon various manufacturing and equipment design constraints. For example, one embodiment of the invention may have a predetermined length consistent with the Sensormatic Ultra*Max EAS sheet label format.

Magazine 302 may be designed to feed individual label strips into indexer 308 one at a time. Each label strip may be stacked within magazine 302, with the adhesive application surface for the labels facing towards the top of magazine 302. Magazine 302 may dispense the strips to indexer 308 from the bottom of magazine 302 in a first-in first-out (FIFO) basis, although the embodiments are not limited in this context. An example of a dispensed strip of labels is shown by label strip 332. Label strip 332 has been enlarged for clarity.

Indexer 308 may engage a dispensed label strip and advance the strip towards separator 310. This may be accomplished in a number of different ways. In one embodiment, indexer 308 may have one or more extenders 306 that are formed to fit interconnect spaces 338 between raised cavity structures 336. Raised cavity structures 336 may be representative of, for example, raised cavity structures 102 described with reference to FIG. 1. In this manner, indexer 308 may make sufficient contact with label strip 332 to maintain positive control of label strip 332 and to ensure proper indexing.

Alternative techniques for engaging label strip 332 may also be used. For example, indexer 308 may have a surface texture that is conducive to contacting the material of label strip 332. For example, in one embodiment label strip 332 may be made of a thin plastic material. Indexer 308 may have a surface texture comprising a small rubber dimple pattern designed to maintain a non-slip interface between label strip 332 and indexer 308. In another example, a pair of pinch rollers and non-slip belt drive may be used to advance label strip 332. It can be appreciated that a number of different ways may also be utilized for a desired implementation, and still fall within the scope of the invention.

Index positioning unit 340 may be connected to indexer 308 to control its movement. Index positioning unit 340 may comprise, for example, an index or step motor to advance label strip 332 to separator 310. The index motor may utilize any technique to advance indexer 308 a predetermined distance in an index or step manner. For example, the index motor may use a mechanical set of stops configured for the desired indexing positions. In another example, the index motor may be communicate control signals with a processing system. The processing system may be configured with the appropriate hardware and software to control indexer 308 for movement through the desired indexing positions, as described in more detail below. The embodiments are not limited in this context.

In one embodiment, index positioning unit 340 may be designed to advance indexer 308 from a start position to an end position, with a plurality of intermediate positions between the start and end positions. The intermediate positions may approximate the width of an individual label, for example. The particular distance between the intermediate positions may vary according to the width of varying individual labels. In this manner, indexer 308 may move individual labels from label strip 332 to separator 310 so that the approximate center of interconnecting flange section 342 is positioned under the cutting blade of separator 310. This process is repeated for each individual label until separator 310 separates all the labels from label strip 332. Index positioning unit 340 may then return to the start position to begin advancing the next dispensed label strip. This process may continue until stopped by an external or predefined event, such as a power interruption, intentional power down, or having magazine 302 run out of label strips 304.

In one embodiment, separator 310 may be a shearing or cutting mechanism to separate a label from the contiguous set of labels, such as label strip 332. In this embodiment, separator 310 may be designed to cut thin sheet plastic used to form the contiguous set of labels. Separator 310 may include a motor 344 and a cutting blade 346, with motor 344 to operate cutting blade 346 in accordance with desired system parameters. The desired system parameters may vary to match the speed at which labels are positioned beneath cutting blade 346, and also to match the depth necessary to completely cut through the material of interconnecting flange sections 342. The embodiments are not limited in this context. Once the individual labels are separated from label strip 332, they may be carried towards applicator 316. An example of separated labels may be represented by, for example, labels 314.

In one embodiment, the carrier may be a carrier 312. Carrier 312 may comprise one or more carrier belts 360 having a plurality of raised structures 328, with the distance between raised structures 328 forming a receiving area 326. A limited number of raised structures 328 are shown for purposes of clarity. Receiving area 326 may be defined to receive raised cavity structure 336, while prohibiting entry of flanges 334 and 338. In this manner, labels 314 may make sufficient contact with carrier 312 for it to move labels 314 towards applicator 316 in a controlled manner. Alternatively, receiving area 326 may be defined to receive the entire label 314, including raised cavity structure 336 and flanges 334 and 338. The embodiments are not limited in this context.

Carrier 312 may carry labels 314 towards applicator 316 in an indexed manner similar to indexer 308. Carrier 312 may have an index motor 356, similar to index positioning unit 340, to advance each label 314 to a desired position under applicator 316. As each label 314 is carried to the proper position under applicator 316, carrier 312 may discontinue movement until applicator 316 dispenses the proper amount of adhesive. Once the proper amount of adhesive is applied to adhesive application surface 324, the next label 314 may be advanced to the appropriate applicator position. This may continue until stopped by an external or predefined event.

In one embodiment, applicator 316 may apply adhesive to an adhesive application surface 324 of label 314. Adhesive application surface 324 may be representative of, for example, adhesive application surface 208 described with reference to FIG. 2B. Applicator 316 may dispense any type of adhesive suitable for a particular label, substrate or implementation. Examples of adhesives may include adhesive 34-4942 made by National Adhesives, and adhesives HL2053 and HL4170 made by H.B. Fuller Company, although the embodiments are not limited in this context.

In one embodiment, applicator 316 may have a dispensing nozzle 348 and a dispensing pump 362. Dispensing nozzle 348 may be positioned and designed to dispense adhesive in the desired dispersion pattern to cover the desired area of adhesive application surface 324. Dispensing pump 362 may be configured to force adhesive through dispensing nozzle 348 in accordance with the appropriate force, interval and duration. Once adhesive has been applied, label 314 may be ready for transfer from carrier 312 to a product, such as product 320.

In one embodiment, carrier 312 may advance the prepared label 314 to impressor 330. In one embodiment, impressor 330 may include a cylinder motor 358, a tamp rod 350 and a tamp pad 354. Tamp rod 350 may comprise, for example, a cylinder extending from cylinder motor 358. Tamp pad 354 may be a pad at one end of tamp rod 350. As carrier belt 360 carries the prepared label 314 to the proper position beneath tamp pad 354, cylinder motor 358 may cause tamp rod 350 to move towards prepared label 314. During the downward extension of tamp rod 350, the bottom surface of tamp pad 354 may press down on a top surface 352 of prepared label 314. Top surface 352 may be representative of, for example, top surface 210 described with reference to FIG. 2A. This continues until the adhesive application side 324 presses down on a substrate 364 of the product, or packaging material for the product. The stroke length for tamp rod 350 may be designed with sufficient distance and timing to ensure proper attachment is made between adhesive application side 324 and substrate 364. Once label 314 has been attached to product 320, tamp rod 350 retracts in preparation for the next attachment cycle to begin.

A carrier 322 may carry product 320 to the proper position for label application by impressor 330. Carrier 322 may be any desired advancing mechanism, such as a carrier similar to carrier 312. The position of carrier 322, product 320 on carrier 322, and impressor 330 needs to be coordinated to ensure that impressor 330 attaches label 314 to product 320 in the desired area. Once impressor 330 attaches label 314 to the appropriate area of product 320, carrier 322 may advance the next product 320 to the proper position beneath tamp pad 354. Once the next product 320 is advanced to the proper position, impressor 330 may repeat the attachment process.

In one embodiment of the invention, impressor 330 may be replaced with another tamp system or blow application device. The blow application device may utilize, for example, air pressure to press label 314 onto substrate 364.

In one embodiment of the invention, applicator 316 may be positioned to dispense adhesive directly on substrate 364 of product 320. In this embodiment, applicator 316 may be rotated approximately 90 degrees such that dispensing nozzle 348 points towards substrate 364. As carrier 322 advances products 320 to impressor 330, applicator 316 may dispense adhesive directly on substrate 364. The dispensing may occur, for example, before product 320 reaches impressor 330. In one embodiment, dispensing nozzle 348 may need to be configured for covering an area approximating the surface area of adhesive application surface 324. Once applicator 316 dispenses the adhesive on the appropriate area of substrate 364, carrier 322 may advance product 320 to beneath impressor 330. Once the area containing the adhesive is properly positioned beneath impressor 330, impressor 330 may then impress label 314 onto substrate 364.

In another embodiment of the invention, applicator 316 may be omitted from the label application system completely. This may be desirable, for example, for those implementations that do not desire the use of adhesive as the fastening mechanism for label 314. In this embodiment, impressor 330 may press or drop label 314 into a predetermined slot or holder for label 314, which may be sealed afterwards. For example, label 314 may be dropped between a pair of laminating surfaces that are heat sealed afterwards. In another example, label 314 may be pressed onto substrate 364 in the proper position on product 320. Label 314 may then be laminated onto product 320. In another example, impressor 330 may drop the label into the product itself, such as a bottle or container, or into the packaging material encapsulating the product. The product or packaging material may then be sealed with the label inside the product or packaging.

The various elements of label application system 300 may be designed to account for the varying size and performance constraints for a given implementation. The positioning, movement, structure and timing of all the elements must be synchronized to achieve the desired results. For example, the advancing process of indexer 308 must be synchronized with the cutting process of separator 310 to ensure that labels 314 are separated from label strip 332 in the appropriate manner. Further, carrier 312 must receive labels 314 from separator 310 at a rate consistent with the cutting process, while advancing labels 314 to applicator 316 and impressor 330 at a rate consistent with the adhesive application process and attachment process, respectively. The appropriate timing may be achieved by varying the operational speed of the various motors, the length of support structures for each element, the size of the individual elements, the positioning of elements, and so forth.

In one embodiment, the synchronization may be accomplished through a processing system connected to the various index motors used by the elements of label application system 300. The processing system may be implemented as software executed by a processor, hardware circuits or structures, or a combination of both. The processor may be a general-purpose or dedicated processor, such as a processor from the family of processors made by Intel® Corporation, Motorola® Incorporated, Sun Microsystems® Incorporated and others. The software may comprise programming logic, instructions or data to implement certain functionality for an embodiment of the invention. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the invention, the media may store programming instructions in a compressed and/or encrypted format, as well as instructions that may have to be compiled or installed by an installer before being executed by the processor. Alternatively, an embodiment of the invention may be implemented as specific hardware components that contain hard-wired logic for performing the recited functionality, or by any combination of programmed general-purpose computer components and custom hardware components.

The processing system may also be modified to replace the index motors with conventional motors. Monitors may be positioned throughout label application system 300. The monitors may be, for example, optical sensors. The monitors may monitor the various elements, such as the magazine, indexer, separator, carrier, applicator and impressor, and provide feedback signals to the processing system. The processing system may use the feedback signals to control movement for the various elements of label application system 300 to maintain proper synchronization.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention. For example, in one embodiment magazine 108 may be bypassed in order to accommodate one or more rolls of contiguous labels. In this embodiment, label application system 100 may further comprise one or more rollers feed to hold a one or more roll of labels. In the case of multiple roller feeds, the embodiment may further comprise a joiner to automatically join one end of the first roll of labels to one end of the second roll of labels. In another example, the motors described in the various embodiments may be replaced by hydraulic or air cylinders to accomplish the same results.

The invention claimed is:

1. A method to apply a label, comprising:

advancing a label from a contiguous set of labels, wherein each label comprises at least one raised cavity structure connected to another label by one or more flange interconnections, wherein the at least one raised cavity structure is formed from a plastic material;

separating said label from said contiguous set of labels proximate to said one or more flange interconnections;

receiving, by an area between raised structures on a carrier belt, the at least one raised cavity structure while prohibiting entry of the one or more flange interconnections;

applying adhesive to said label; and pressing said label onto an object.

2. The method of claim 1, wherein said label is advanced from a first position to a second position, with a distance between said first and second positions approximating a width for said label.

3. The method of claim 2, wherein said label is carried to an applicator.

4. The method of claim 3, wherein said label has an adhesive application side, and said label is carried to said applicator with said adhesive application side exposed.

5. The method of claim 4, wherein said adhesive is applied to said adhesive application side.

6. The method of claim 5, wherein said object has a substrate, and said adhesive application side of said label is pressed onto said substrate to attach said label to said object.

7. A method for applying an electronic article surveillance (EAS) label to an object comprising:

advancing an EAS label from a contiguous set of EAS labels, wherein each of said EAS labels comprises at least one raised cavity structure connected to another of said EAS labels by one or more flange interconnections, wherein the least one raised cavity structure is formed from a plastic material;

separating said EAS label from said contiguous set of EAS labels proximate said one or more flange interconnections;

receiving, by an area between raised structures on a carrier belt, the at least one raised cavity structure while prohibiting entry of the one or more flange interconnections;

applying adhesive to said EAS label; and applying said EAS label onto an object.

8. The method of claim 7, wherein said label is advanced from a first position to a second position, with a distance between said first and second positions approximating a width for said label.

9. The method of claim 8, wherein said label is carried to an applicator.

10. The method of claim 9, wherein said label has an adhesive application side, and said label is carried to said applicator with said adhesive application side exposed.

11. The method of claim 10, wherein said adhesive is applied to said adhesive application side.

12. The method of claim 11, wherein said object has a substrate, and said adhesive application side of said label is pressed onto said substrate to attach said label to said object.

* * * * *